(12) United States Patent
Vokaliga et al.

(10) Patent No.: US 10,768,851 B2
(45) Date of Patent: Sep. 8, 2020

(54) INSTANT-READY ACTIVE-ACTIVE STORAGE NODES

(71) Applicant: EMC IP HOLDING COMPANY LLC, Hopkinton, MA (US)

(72) Inventors: Deepak Vokaliga, Hopkinton, MA (US); Michael Specht, Boxborough, MA (US); Mohammed Asher, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 66 days.

(21) Appl. No.: 16/174,369

(22) Filed: Oct. 30, 2018

(65) Prior Publication Data

US 2020/0133499 A1    Apr. 30, 2020

(51) Int. Cl.
*G06F 3/06* (2006.01)

(52) U.S. Cl.
CPC ............ *G06F 3/065* (2013.01); *G06F 3/0604* (2013.01); *G06F 3/0683* (2013.01)

(58) Field of Classification Search
CPC .............................. G06F 16/184; H04L 67/42
USPC .......................................................... 711/154
See application file for complete search history.

(56) References Cited

U.S. PATENT DOCUMENTS

| | | | | |
|---|---|---|---|---|
| 7,739,233 | B1* | 6/2010 | Ghemawat | G06F 16/1844 707/610 |
| 7,778,972 | B1* | 8/2010 | Cormie | G06F 3/0607 707/626 |
| 9,658,983 | B1* | 5/2017 | Barber | G06F 16/219 |
| 2008/0002635 | A1* | 1/2008 | Mosko | H04W 28/14 370/338 |
| 2008/0005199 | A1* | 1/2008 | Chen | H04L 67/1095 |
| 2009/0106242 | A1* | 4/2009 | McGrew | G06F 16/258 |
| 2011/0161293 | A1* | 6/2011 | Vermeulen | H04L 67/42 707/626 |
| 2012/0030511 | A1* | 2/2012 | Wylie | G06F 11/1076 714/15 |
| 2012/0117154 | A1* | 5/2012 | Kodama | G06F 16/1844 709/205 |

* cited by examiner

*Primary Examiner* — Titus Wong
(74) *Attorney, Agent, or Firm* — Anderson Gorecki LLP

(57) ABSTRACT

In a data storage system in which a first storage array and a second storage array maintain first and second replicas of a production volume, the replicas are made discoverable and accessible while inconsistent. Each storage array maintains an invalid track list of inconsistencies. Initially, all tracks are marked as invalid. While background synchronization is eliminating inconsistencies, accesses to invalid tracks are resolved by exchanging data associated with IOs and updating the invalid track lists based on IO bias and other factors.

20 Claims, 8 Drawing Sheets

INSTANT-READY ACTIVE-ACTIVE STORAGE NODES

BACKGROUND

The subject matter of this disclosure is generally related to computer networks in which two or more storage arrays maintain a replicated logical production volume. Production volumes may be referred to as production devices or production LUNs, where LUN (Logical Unit Number) is a number used to identify the logical storage volume in accordance with the SCSI (Small Computer System Interface) protocol. When the storage arrays are in an active-passive mode the replica maintained on the primary (active) side, typically referred to as R1 (replica 1), is used to service IOs. Updates to the production volume are asynchronously made to the replica maintained on the secondary (passive) side, which is typically referred to as R2 (replica 2). Consequently, R1 and R2 are usually at least partly inconsistent at any point in time. In order to transition into an active-active mode R2 is first made fully consistent with R1. The characteristics of R1 and R2 are also converged, e.g. states, reservations, storage capacity, LBAs (logical block addresses), volume identifiers (e.g. SCSI ID), etc., so that R1 and R2 are not distinguishable as distinct replicas from the perspective of a host that uses the replicated volume to maintain host application data. Procedures are implemented to synchronize updates to both R1 and R2 in order to maintain consistency. Both R1 and R2 are then declared ready for discovery by hosts, and active-active mode commences. The process of transitioning to active-active mode may take minutes, hours or days to complete depending on the data set to copy to R2 and the bandwidth available.

SUMMARY

All examples, aspects, and features mentioned in this document can be combined in any technically conceivable way.

In accordance with an aspect an apparatus comprises: a first storage array comprising a plurality of interconnected computing nodes, each of the computing nodes comprising at least one processor and non-transitory memory, and a plurality of groups of data storage drives, each group of data storage drives connected with one of the computing nodes, wherein the first storage array maintains a first replica of a production volume comprising contiguous logical block addresses that map to non-contiguous addresses of the data storage drives; a second storage array comprising a plurality of interconnected computing nodes, each of the computing nodes comprising at least one processor and non-transitory memory, and a plurality of groups of data storage drives, each group of data storage drives connected with one of the computing nodes, wherein the second storage array maintains a second replica of the production volume comprising contiguous logical block addresses that map to non-contiguous addresses of the data storage drives; and program code stored on the non-transitory memory of the first storage array and the second storage array, the program code comprising: instructions that converge differing characteristics of the first replica and the second replica; instructions that cause the first replica and the second replica to be discoverable and accessible to hosts while the first replica is inconsistent with the second replica; and instructions that resolve accesses to extents of data that are inconsistent between the first replica and the second replica based at least in-part on access bias, where the first storage array has preferential bias over the second storage array. In some implementations the first storage array maintains a first invalid extent record that indicates which extents of the first replica have not been synchronized with the second replica, and the second storage array maintains a second invalid extent record that indicates which extents of the second replica are considered invalid as inconsistent and which are locally invalid. In some implementations all extents are marked as invalid in the first invalid extent record and the second invalid extent record before the first replica and the second replica become discoverable and accessible. In some implementations the first storage array receives a read command from a host computer to a remotely invalid track of the first replica and, in response, provides a corresponding extent from the first replica to the host computer based on access bias and data validity. In some implementations the first storage array receives a write command from a host computer to a remotely invalid track on the first replica and, in response, writes associated data to the first replica and provides the data to the second storage array where the track is locally invalid. In some implementations the second storage array writes the data to the second replica, updates the second invalid extent record to indicate that a corresponding extent is valid, and provides an acknowledgement to the first storage array. In some implementations the first storage array updates the second invalid extent record to indicate that a corresponding extent is valid and provides an acknowledgement to the host. In some implementations the second storage array receives a read command from a host computer to a locally invalid track of the second replica and, in response, provides a corresponding extent from the second replica to the host computer based on the extent being present in the memory. In some implementations the second storage array receives a read command from a host computer to a locally invalid track of the second replica and, in response, reads a corresponding extent from the first replica and provides the extent to the host computer based on the extent being absent from the memory of the second storage array. In some implementations the second storage array receives a write command from a host computer to a locally invalid track on the second replica and, in response, writes corresponding data to the second replica, provides the data to the first storage array, where the first storage array writes the data to the first replica, updates the first invalid extent record to indicate that a corresponding extent is valid, and secondary storage provides an acknowledgement to the host.

In accordance with an aspect a method comprises: in a network comprising: a first storage array comprising a plurality of interconnected computing nodes, each of the computing nodes comprising at least one processor and non-transitory memory, and a plurality of groups of data storage drives, each group of data storage drives connected with one of the computing nodes, wherein the first storage array maintains a first replica of a production volume comprising contiguous logical block addresses that map to non-contiguous addresses of the data storage drives; and a second storage array comprising a plurality of interconnected computing nodes, each of the computing nodes comprising at least one processor and non-transitory memory, and a plurality of groups of data storage drives, each group of data storage drives connected with one of the computing nodes, wherein the second storage array maintains a second replica of the production volume comprising contiguous logical block addresses that map to non-contiguous addresses of the data storage drives: converging differing characteristics of the first replica and the second replica; causing the first replica and the second replica to be discoverable and accessible to hosts while the first replica is inconsistent with the second replica; and resolving accesses to extents of data that are inconsistent between the first replica and the second replica based at least in-part on access bias, where the first storage array has preferential bias over the second storage array. Some implementations comprise the first storage array maintaining a first invalid extent record that indicates which extents of the first replica have not been synchronized with the second replica, and the second storage array maintaining a second invalid extent record that indicates which extents of the second replica are considered invalid as inconsistent and which are locally invalid. Some implementations comprise marking all extents in the first invalid extent record and the second invalid extent record as invalid before causing the first replica and the second replica become discoverable and accessible. Some implementations comprise the first storage array receiving a read command from a host computer to a remotely invalid track of the first replica and, in response, providing a corresponding extent from the first replica to the host computer based on access bias and data validity. Some implementations comprise the first storage array receiving a write command from a host computer to a remotely invalid track on the first replica and, in response, writing associated data to the first replica and providing the data to the second storage array where the track is locally invalid. Some implementations comprise the second storage array writing the data to the second replica, updating the second invalid extent record to indicate that a corresponding extent is valid, and providing an acknowledgement to the first storage array. Some implementations comprise the first storage array updating the second invalid extent record to indicate that a corresponding extent is valid and providing an acknowledgement to the host. Some implementations comprise the second storage array receiving a read command from a host computer to a locally invalid track of the second replica and, in response, providing a corresponding extent from the second replica to the host computer based on the extent being present in the memory. Some implementations comprise the second storage array receiving a read command from a host computer to a locally invalid track of the second replica and, in response, reading a corresponding extent from the first replica and provides the extent to the host computer based on the extent being absent from the memory of the second storage array. Some implementations comprise the second storage array receiving a write command from a host computer to a locally invalid track on the second replica and, in response, writing corresponding data to the second replica, and providing the data to the first storage array, and the first storage array writing the data to the first replica, updating the first invalid extent record to indicate that a corresponding extent is valid, and providing an acknowledgement to the host.

Other aspects, features, and implementations may become apparent in view of the detailed description and figures.

DETAILED DESCRIPTION

Some aspects, features, and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor hardware components. For ease of exposition, not every step, device, or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The terms "physical" and "real" are used to refer to tangible features. For example, a virtual storage device could be based on multiple physical storage drives. The term "logic" is used to refer to one or more of special purpose electronic hardware and software instructions that are stored on a non-transitory computer-readable medium and implemented by general-purpose tangible processors.

Figure 1:
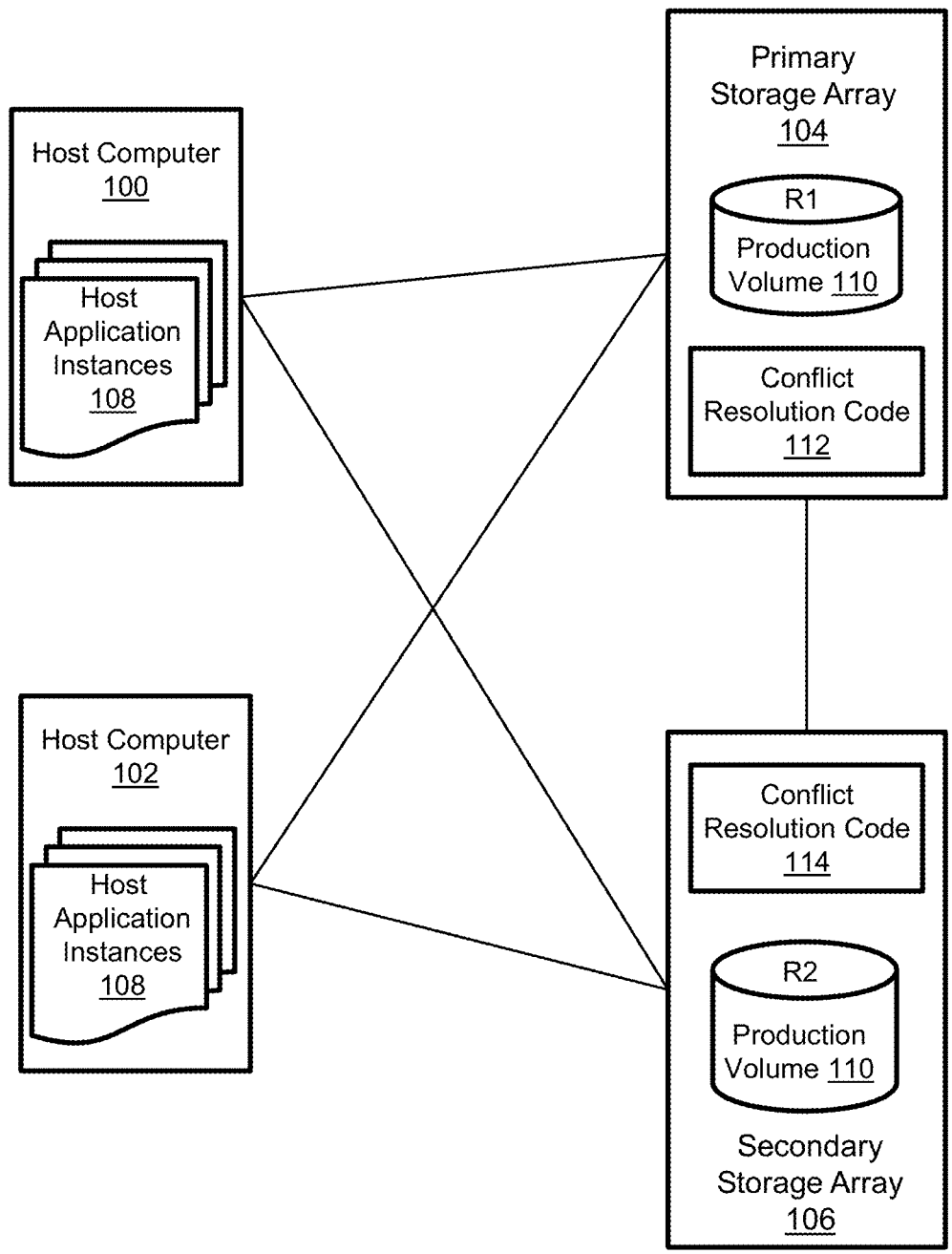
FIG. 1 illustrates a computer network in which the time required for transition into active-active mode is reduced by enabling discovery and access while the replicas are inconsistent.

FIG. 1 illustrates a computer network in which the time required for transition of a replicated production volume into active-active mode is reduced by enabling discovery and access while the replicas are inconsistent. Conflict resolution code resolves IOs to inconsistent extents while the replicas are being synchronized in the background. The illustrated network includes host computers 100, 102 and storage arrays 104, 106. The term "storage array" is intended to be interpreted broadly and includes any type of storage node with which the recited functions can be implemented. Storage array 104 is designated as the primary storage node in the illustrated example. Storage array 106 is designated as the secondary storage node in the illustrated example. The designations as primary and secondary are based on storage array 104 having preferential "IO bias" over storage array 106 for purposes of conflict resolution. The host computers 100, 102 run instances 108 of host applications. The primary storage array 104 creates a primary-side replica (R1) of a logical production volume 110, and presents R1 to the host computers 100, 102 for storage of host application data. The secondary storage array 106 creates a secondary-side replica (R2) of the logical production volume 110, and presents R2 to the host computers 100, 102 for storage of host application data. The host computers 100, 102 and the storage arrays 104, 106 may utilize SCSI or any other suitable protocol for implementing storage-related commands. The host computers are "initiators," which means that they issue TO commands. The storage arrays usually function as "targets," which means that they implement TO commands. However, the storage arrays may function as, or like, initiators as will be explained below.

Figure 2:
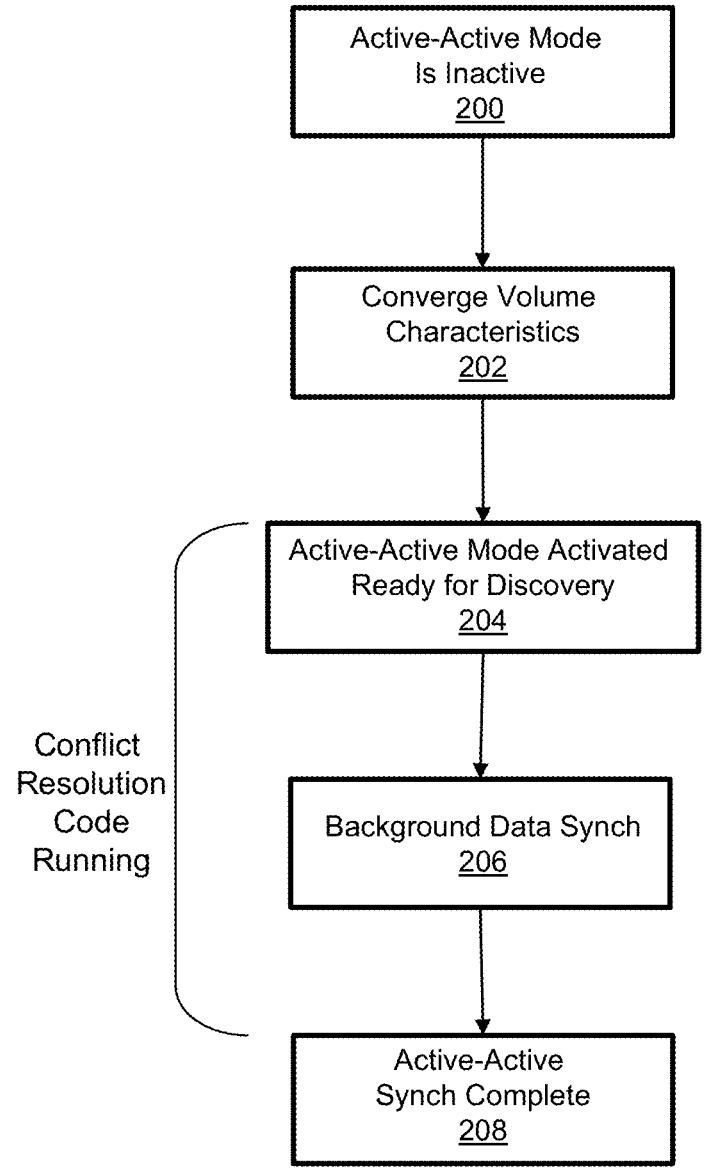
FIG. 2 is a flow chart that illustrates transition into active-active mode.

Referring to FIGS. 1 and 2, the storage arrays are configured to transition into active-active mode while R1 and R2 are inconsistent. Starting from block 200 in which active-active mode is inactive and R1 and R2 are inconsistent, the characteristics of R1 and R2 are converged in block 202. For example, and without limitation, the total capacity of the replicas (R1 and R2), LBAs (logical block addresses) of the replicas, and volume identifiers (e.g. SCSI LUN IDs) of the replicas are synchronized (made to be identical) such that R1 and R2 do not appear as different volumes from the perspective of the host computers. Active-active mode is then activated as indicated in block 204, at which point R1 and R2 may be discovered and accessed by the host computers 100, 102. However, R1 and R2 are still inconsistent at the point in time when active-active mode is activated. While R1 and R2 are inconsistent and in active-active mode the conflict resolution code 112, 114 running on the primary storage array and the secondary storage array, respectively, handles IOs associated with extents of data that are inconsistent between R1 and R2. Data is exchanged in the background between R1 and R2 to synchronize the replicas over time as indicated in block 206. R1 and R2 are eventually made consistent through background synchronization as indicated in block 208, and that consistency may be maintained using known procedures.

Figure 3:
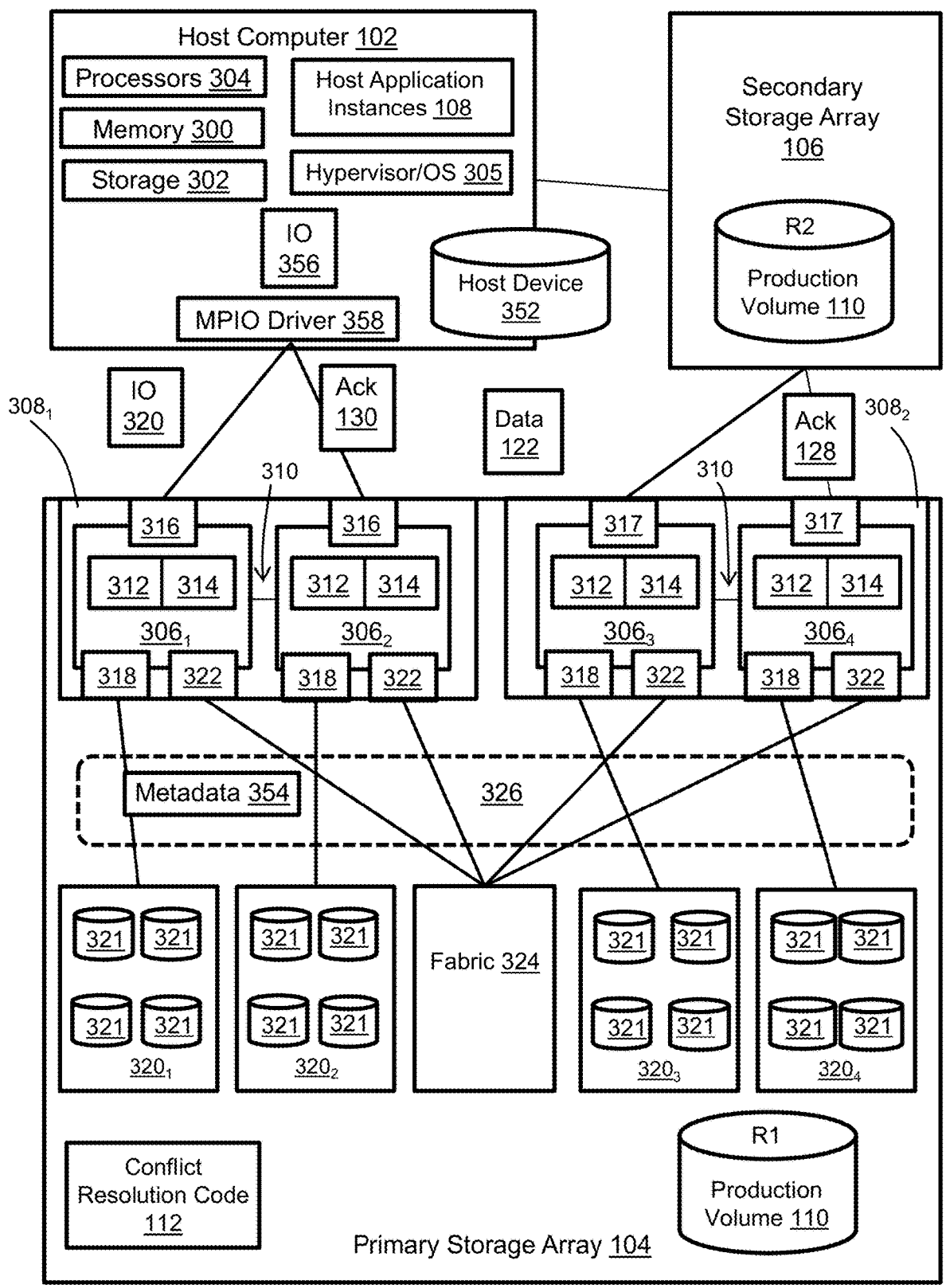
FIG. 3 illustrates the host computers and storage arrays of FIG. 1 in greater detail.

FIG. 3 illustrates aspects of the host computers and storage arrays of FIG. 1 in greater detail. Although only the primary storage array 104 is shown in detail, both storage arrays may be identical or substantially similar. The host computers may also be identical or substantially similar. In the illustrated example the host computer 102 is a server with volatile memory 300, persistent storage 302, one or more tangible processors 304, and an OS (operating system) or hypervisor 305. The host computer might support virtual hosts running on virtual machines or in containers, and although an external host computer is illustrated, internal hosts may be instantiated within the storage arrays. The primary storage array 104 includes a plurality of computing nodes $306_1$-$306_4$. Pairs of the computing nodes, e.g. ($306_1$, $306_2$) and ($306_3$, $306_4$), may be organized as storage engines $308_1$, $308_2$, respectively, for purposes of failover. The paired computing nodes of each storage engine may be directly interconnected by communication links 310. Each computing node includes at least one tangible multi-core processor 312 and a local cache 314. The local cache 314 may include, for example and without limitation, volatile memory components such as RAM (random access memory) of any type. Some of the computing nodes $306_1$, $306_2$ include HAs (host adapters) 316 for communicating with the host computer 102. Some of the computing nodes $306_3$, $306_4$ include RAs (remote adapters) 317 for communicating with the secondary storage array 106. The computing nodes also include DAs (disk adapters) 318 for communicating with managed drives 321 in their respective back-end storage bays $320_1$-$320_4$. The managed drives 321 may include tangible storage components of one or more technology types, for example and without limitation SSDs (solid state devices) such as flash, and HDDs (hard disk drives) such as SATA (Serial Advanced Technology Attachment) and FC (Fibre Channel). The computing nodes may also include one or more CAs (channel adapters) 322 for communicating with other computing nodes via an interconnecting fabric 324. Each computing node may allocate a portion or partition of its respective local cache 314 to a virtual shared "global" cache 326 that can be accessed by other computing nodes, e.g. via DMA (direct memory access) or RDMA (remote direct memory access).

The primary storage array 104 maintains data on R1 for the host application instances 108 running on the host computer 102 (and other host computers). Host applications may access the production volume by prompting their host computer to send IO commands to the primary storage array. Examples of host applications may include but are not limited to file servers, email servers, block servers and databases. The host computer maintains a host device 352, which is a host-local representation of the production volume. The host device 352 and production volume represent abstraction layers between the managed drives 321 and the host application instances 108. From the perspective of the host application instances, the host device 352 is a single data storage device having a set of contiguous fixed-size LBAs on which data used by the host applications resides. However, the data used by the host applications may actually be maintained by the computing nodes $306_1$-$306_4$ at non-contiguous addresses on various different managed drives 321.

In order to service IOs from the host application instances 108, the primary storage array 104 maintains metadata 354 that indicates, among various things, mappings between the LBAs of the production volume and the locations of extents of host application data on the managed drives 321. In response to an IO command 356 from one of the host application instances to host device 352, an MPIO (Multi-Path Input-Output) driver 358 determines whether the IO can be serviced by accessing the host computer memory 300. If that is not possible then the MPIO driver generates IO command 320 with reference to the production volume 110 and selects a path on which to send the IO command. The selected path may be connected to either of the storage arrays. In the illustrated example there are multiple paths between the host computer 102 and the primary storage array 104, e.g. one path per HA 316. Each path may have a locally unique address that is known to the MPIO driver 358. However, the host application is not aware of the paths and addresses because it views the host device 352 as being available via a single logical path. The paths may be selected by the MPIO driver based on a wide variety of techniques and algorithms including, for context and without limitation, performance and load balancing.

In the case of a read directed to computing node $306_1$ when R1 and R2 are consistent, the primary storage array uses the metadata 354 to locate the requested data, e.g. in the shared cache 326 or managed drives 321. If the requested data is not in the shared cache, then the data is temporarily copied into the shared cache from the managed drives and sent to the host application via one of the computing nodes. In the case of a write when R1 and R2 are consistent the storage array creates new metadata that maps to the location at which the data is written on the managed drives 321. The data is also provided to the secondary storage array so that consistency between R1 and R2 can be maintained.

Figure 4:
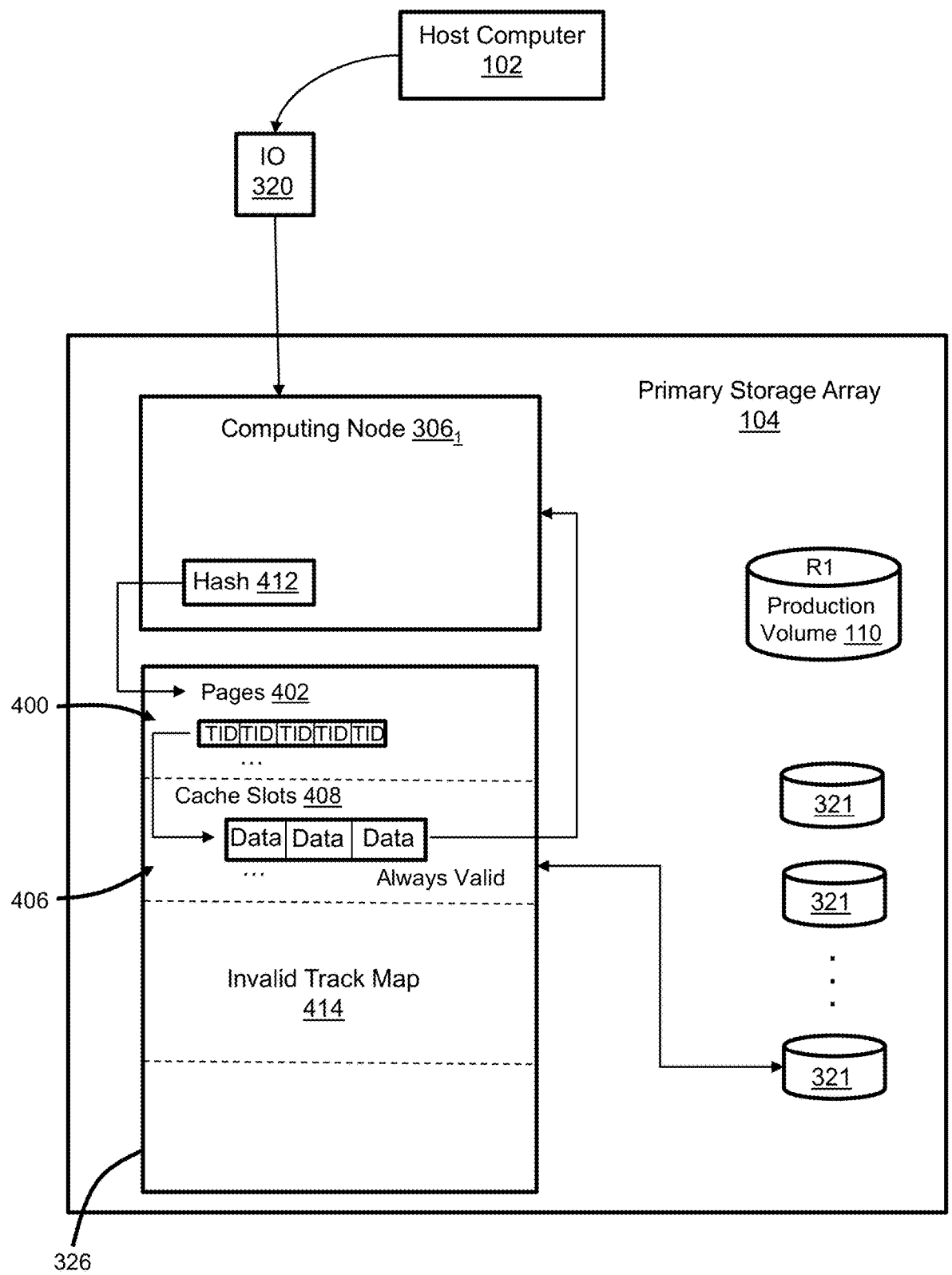
FIG. 4 illustrates aspects of IO processing by a storage array in greater detail.

FIG. 4 illustrates aspects of IO processing by the primary storage array 104 in greater detail. The metadata (354, FIG. 3) may be maintained in TIDs (track ID tables) 400 that are stored in fixed-size pages 402 of the shared memory 326. The TIDs 400 contain pointers to host application data 406 located in cache slots 408 in the shared memory 326. In response to IO 320, computing node 306₁ identifies corresponding TIDs by inputting information from IO 320 that references the production volume 110, e.g. the device number, cylinder number, head (track), and size. The information is inputted into a hash table 412 in the illustrated example, but a wide variety of descriptive data structures other than a hash table could be used. The hash table 412 indicates the locations of the corresponding TIDs in the pages 402 by outputting page numbers. Each page number is used to locate the page in memory that holds one of the TIDs. The TID is then obtained from that page. The TID may include a pointer to the cache slots or managed drives. An invalid track map 414 indicates which tracks of R1 are viewed as being inconsistent with R2.

In order to commence transition into active-active mode all tracks are marked as invalid in the invalid track maps of both the primary and secondary storage arrays. However, all data in the cache slots 408 of both storage arrays is considered to be valid. For example, the invalid bitmap on the primary storage array is updated to indicate that R2 has not been synchronized with R1 although all the local data on R1 is valid in cache and on disk of the primary storage array. It is not certain from the perspective of the primary storage array that all of the R2 tracks marked as invalid, i.e. remote invalids, are truly inconsistent with R1. The tracks marked as invalid in the invalid bitmap on the secondary storage array truly represent that the data is locally invalid on the disk. Nevertheless, any data which is in cache on the secondary storage array is still valid. In response to IO 320, the TID is obtained from the pages 402 and used to find the corresponding data in the cache slots 408, location in the managed drives 321, and determine whether the invalid track map 414 indicates that the track associated with the obtained TID is valid. Processing of consistent tracks has already been described above. Processing of invalid tracks by the conflict resolution code is described below.

Figure 5:
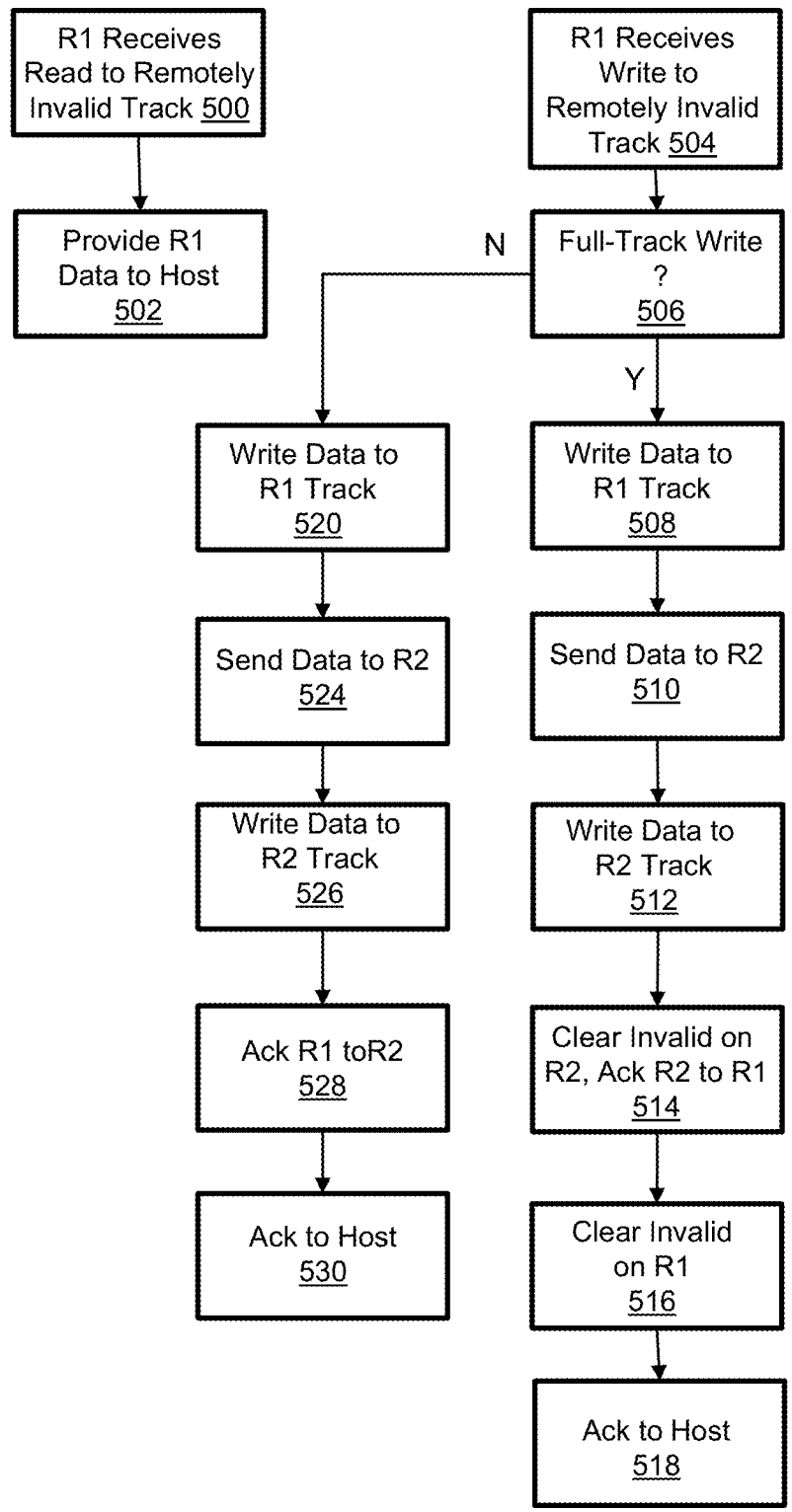
FIG. 5 is a flow diagram illustrating handling of reads and writes to tracks that are locally invalid on R1.

FIG. 5 is a flow diagram illustrating conflict resolution code handling of reads and writes to tracks that are remotely invalid on R1, i.e. marked as invalid in the invalid track map of the primary storage array representing that the data on R1 is not yet synched with R2. If the primary storage array receives a read command from a host computer to a remotely invalid track of R1 as indicated at block 500, then the corresponding data from R1 is provided to the host computer as indicated at block 502. This is done regardless of whether the data is already in the cache slots (cache hit) or has to be copied into the cache slots from the manage drives (cache miss) because R1 is on the primary side, which has the valid data from the beginning and also has preferential IO bias. However, the remote invalid track map is not updated so the track is still left as invalid on R1 on the remote mirror.

If the primary storage array receives a write command from a host computer to a remotely invalid track on R1 as indicated at block 504, the conflict resolution code determines whether it is a full-track write as indicated in block 506. In the case of a full-track write the data is written to the corresponding track of R1 as indicated in block 508. A copy of the data is sent to the secondary storage array as indicated in block 510. The data is written to the corresponding track of R2 as indicated in block 512. The invalid track map on the secondary storage array is then updated to clear the invalid marker for that track as indicated in block 514, after which the track is viewed as being locally valid on R2. An Ack (acknowledgment) is sent from the secondary storage array to the primary storage array as part of block 514 to indicate that the data has been written to R2. The invalid track map on the primary storage array can be updated to clear the invalid as indicated in block 516 or left as is. If the remote invalid is cleared, then afterward the track is viewed as being synched on R2 from R1; a remote invalid is not required to track that. An Ack is then sent to the host computer as indicated in block 518.

In the case of a partial-track write, as determined in block 506, the data is written to the corresponding track of R1 as indicated in block 520. The data is sent to the secondary storage array as indicated in block 524 and written to the corresponding R2 track as indicated in block 526. However, updates are not made to the invalid track maps on either the primary storage array or the secondary storage array, i.e. the track remains marked as locally invalid on both R1 and R2. An Ack is sent from R1 to R2 as indicated in block 528 and an Ack of write completion is sent to the host computer as indicated in block 530.

Figure 6:
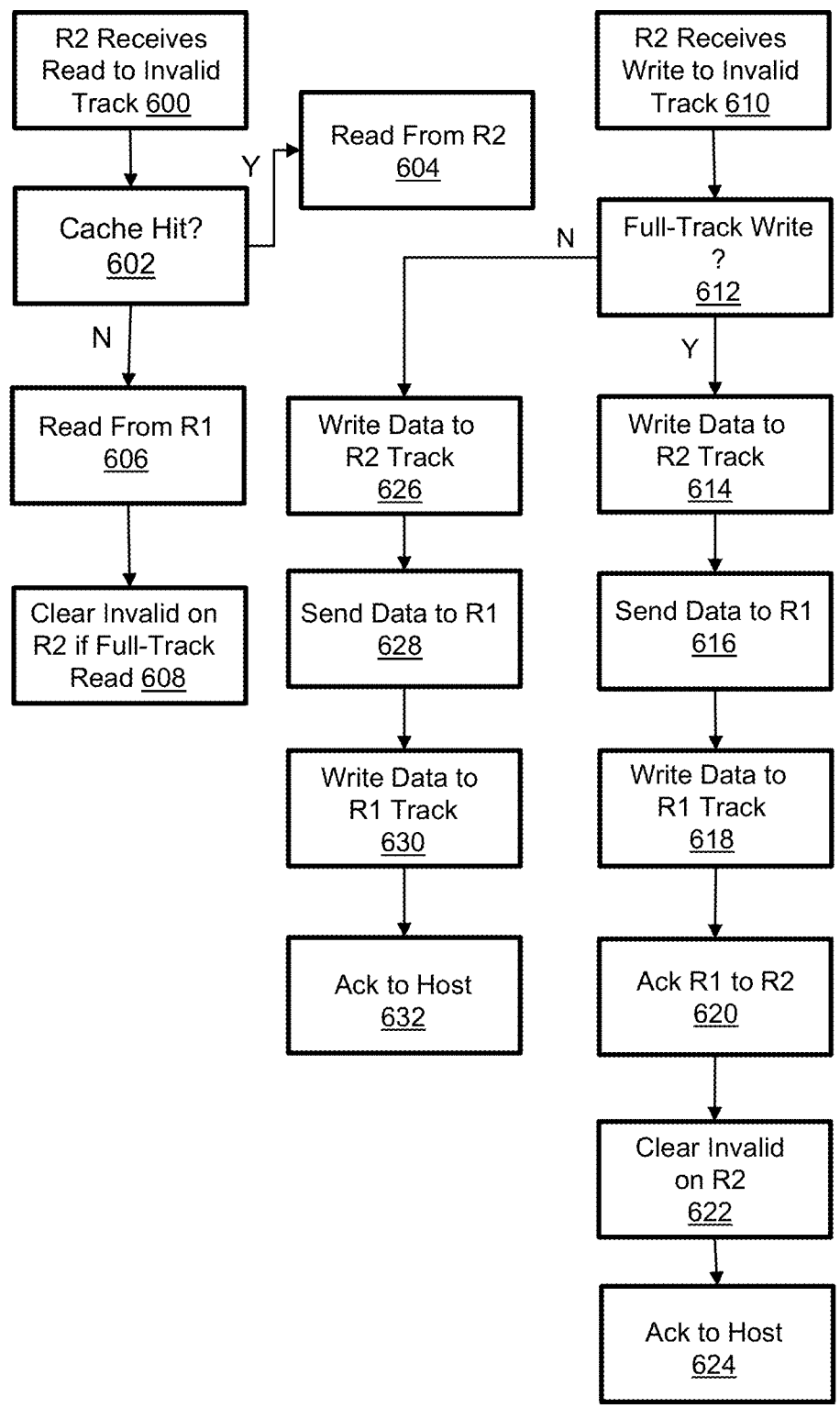
FIG. 6 is a flow diagram illustrating handling of reads and writes to tracks that are locally invalid on R2.

FIG. 6 is a flow diagram illustrating conflict resolution code handling of reads and writes to tracks that are locally invalid on R2. If the secondary storage array receives a read command from a host computer to a locally invalid track of R2 as indicated at block 600, then the TID is identified to determine whether there is a cache hit as indicated in block 602. In the case of a cache hit, i.e. the data is already in the cache slots, the data is read from R2 and provided to the host computer as indicated by block 604. This is done because data in the cache slots is always considered valid. However, the invalid track map on the secondary storage array is not updated to indicate that the track is valid. In the case of a cache miss the data is read from R1 as indicated in block 606. This is done because R1 is on the primary storage array, which has the data and preferential IO bias over the secondary storage array. Reading the data from R1 results in the track being copied into the cache slots on the secondary storage array and subsequently de-staged to the managed drives so the invalid marker is cleared on R2 (i.e. cleared in the invalid track map of the secondary storage array) if the read is a full-track read as indicated in block 608.

If the secondary storage array receives a write command from a host computer to a locally invalid track on R2 as indicated at block 610, then the conflict resolution code determines whether it is a full-track write as indicated in block 612. In the case of a full-track write the data is written to the corresponding track of R2 as indicated in block 614. A copy of the data is sent to R1 as indicated in block 616. The data is written to the corresponding track of R1 as indicated in block 618. The invalid track map on the primary storage array is then updated to clear the invalid as indicated in block 620, after which the track is viewed as being locally valid on R1. An Ack (acknowledgment) is sent from R1 to R2 as part of block 620 to indicate that the data has been written to R1. The invalid track map on the secondary storage array is then updated to clear the invalid as indicated in block 622, after which the track is viewed as being locally valid on R2. An Ack is then sent to the host computer as indicated in block 624.

In the case of a partial-track write as determined in block 612 the data is written to the corresponding track of R2 as indicated in block 626. The data is sent to R1 as indicated in block 628 and written to the corresponding R1 track as indicated in block 630. An Ack of write completion is sent to the host computer as indicated in block 632. However, updates are not made to the invalid track maps on either the primary storage array or secondary storage array, i.e. the track remains marked as locally invalid on both R1 and R2.

Figure 7:
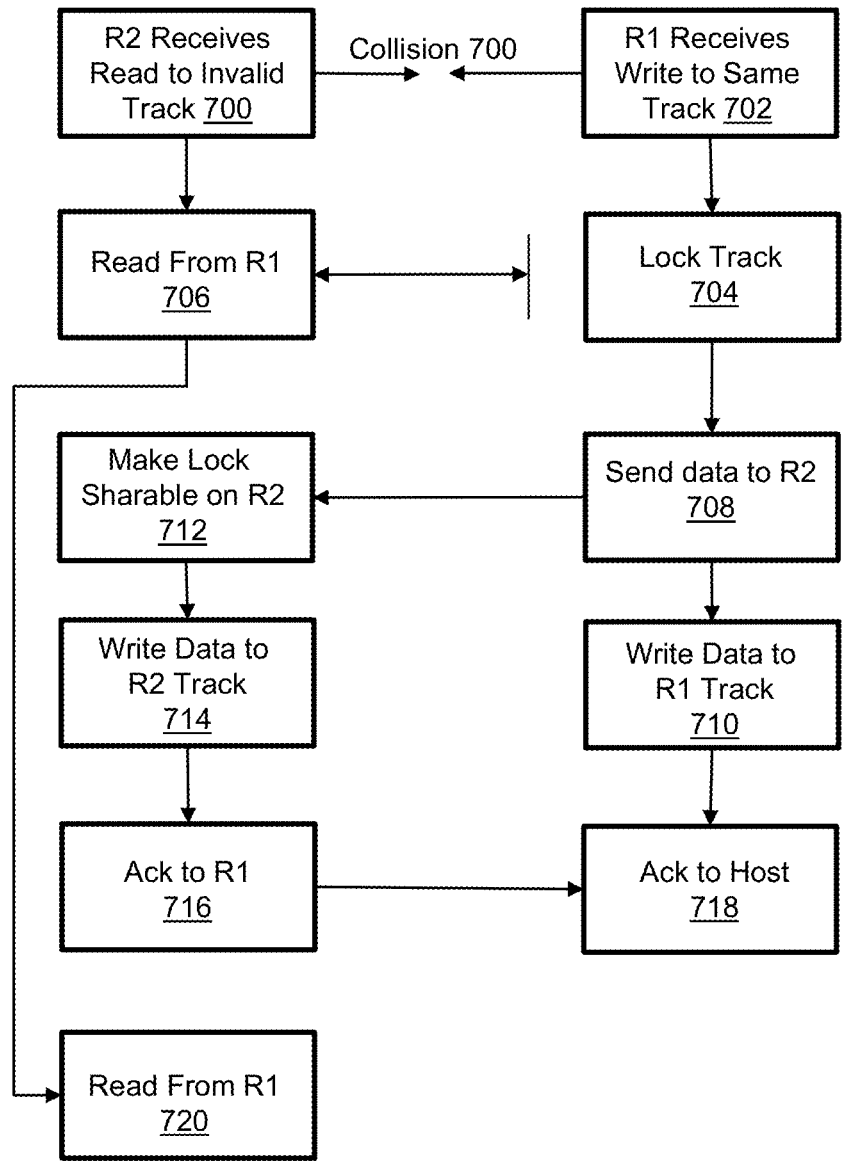
FIG. 7 is a flow diagram illustrating handling of a collision.

FIG. 7 is a flow diagram illustrating conflict resolution code handling of a collision 700. The collision results when the secondary storage array receives a read to an invalid track as indicated in block 700 proximate in time to when the primary storage array receives a write to the same track as indicated in block 702. Pursuant to implementing the write, the primary storage array locks the track on R1 as indicated in block 704. The secondary storage array attempts to read the track from R1 as indicated at block 706 but is thwarted because the track has been locked by the primary storage array. Pursuant to the write, the primary storage array sends the data being written to the secondary storage array as indicated in block 708 and writes the data to the track on R1 as indicated in block 710. The secondary storage array makes its lock on the track of R2 sharable (i.e. yields to the primary) as indicated in step 712 because the primary storage array has IO bias. The data is then written to the track of R2 as indicated in block 714. The secondary storage array sends an Ack to the primary storage array to indicate that the data has been written to R2 as indicated in block 716. The primary storage array then sends an Ack to the host computer as indicated in block 718 to indicate that the write has been implemented. At some later time, the secondary storage array retries the read from R1 as indicated in block 720 and succeeds because the track on R1 is unlocked. At the time of retry if the data is in cache because of the previous write then the read can be locally serviced. If the read was for a different block in the 128K track then it needs to go to R1.

Figure 8:
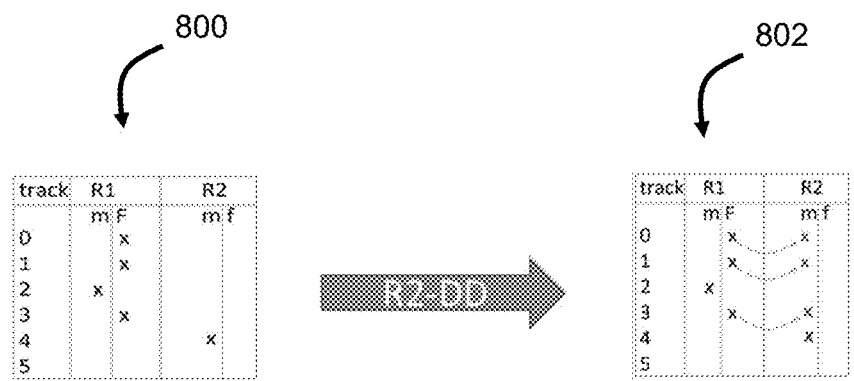
FIG. 8 illustrates a refresh process for responding to a link failure between the R1 and R2.

FIG. 8 illustrates a refresh process for responding to a link failure between R1 and R2. The situation may occur when the link failure occurs after the replicas have been transitioned into active-active mode but are still inconsistent. During the period of time when data copying between the replicas is disabled the hosts are prevented from accessing R2 and are caused to access R1. When an IO causes an update to the replicated volume, the data is written to R1 and marked as being invalid on R2 in a record 800, such as a remote invalid bitmap table, which may be maintained on the primary storage array. The invalid tracks accumulate while the link is down until copying between the replicas is enabled. The record 800 of accumulated invalid tracks is then provided to the secondary storage array and used to update the invalid track map of the secondary storage array as indicated in block 802 before the secondary storage array resumes active-active status. Thus, any tracks that were marked as valid on R2 (on the secondary storage array invalid track map) before link failure and were updated on R1 during link failure become marked as invalid on R2.

Atomic writes are handled in an analogous manner to non-atomics. On an atomic write to R1 of a track that is locally invalid on R2 the data is not committed to R1 unless it is also committed to R2. Nevertheless, the invalid is not cleared on the primary storage array. On an atomic write to R2 of a track that is locally invalid the data is fetched from R1. The atomic write data is written to a scratch slot on the secondary storage array and provided to the primary storage array. If R1 is successfully updated with the data, then R2 is updated with the data. In the case of collision of atomic writes the side with preferential IO bias "wins" and is implemented; the other side rejects the atomic write command with a retry code.

A number of features, aspects, examples, and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. Apparatus comprising:
    a first storage array comprising a plurality of interconnected computing nodes, each of the computing nodes comprising at least one processor and non-transitory memory, and a plurality of groups of data storage drives, each group of data storage drives connected with one of the computing nodes, wherein the first storage array maintains a first replica of a production volume comprising contiguous logical block addresses that map to non-contiguous addresses of the data storage drives;
    a second storage array comprising a plurality of interconnected computing nodes, each of the computing nodes comprising at least one processor and non-transitory memory, and a plurality of groups of data storage drives, each group of data storage drives connected with one of the computing nodes, wherein the second storage array maintains a second replica of the production volume comprising contiguous logical block addresses that map to non-contiguous addresses of the data storage drives; and
    program code stored on the non-transitory memory of the first storage array and the second storage array, the program code comprising:
        instructions that converge differing characteristics of the first replica and the second replica;
        instructions that cause the first replica and the second replica to be discoverable and accessible to hosts while the first replica is inconsistent with the second replica; and
        instructions that resolve accesses to extents of data that are inconsistent between the first replica and the second replica based at least in-part on access bias, where the first storage array has preferential bias over the second storage array.

2. The apparatus of claim 1 in which the first storage array maintains a first invalid extent record that indicates which extents of the first replica have not been synchronized with the second replica, and in which the second storage array maintains a second invalid extent record that indicates which extents of the second replica are considered invalid as inconsistent and which are locally invalid.

3. The apparatus of claim 2 wherein all extents are marked as invalid in the first invalid extent record and the second invalid extent record before the first replica and the second replica become discoverable and accessible.

4. The apparatus of claim 3 wherein the first storage array receives a read command from a host computer to a remotely invalid track of the first replica and, in response, provides a corresponding extent from the first replica to the host computer based on access bias and data validity.

5. The apparatus of claim 3 wherein the first storage array receives a write command from a host computer to a remotely invalid track on the first replica and, in response, writes associated data to the first replica and provides the data to the second storage array where the track is locally invalid.

6. The apparatus of claim 5 wherein the second storage array writes the data to the second replica, updates the second invalid extent record to indicate that a corresponding extent is valid, and provides an acknowledgement to the first storage array.

7. The apparatus of claim 6 wherein the first storage array updates the second invalid extent record to indicate that a corresponding extent is valid and provides an acknowledgement to the host.

8. The apparatus of claim 3 wherein the second storage array receives a read command from a host computer to a locally invalid track of the second replica and, in response, provides a corresponding extent from the second replica to the host computer based on the extent being present in the non-transitory memory of the second storage array.

9. The apparatus of claim 3 wherein the second storage array receives a read command from a host computer to a locally invalid track of the second replica and, in response, reads a corresponding extent from the first replica and provides the extent to the host computer based on the extent being absent from the non-transitory memory of the second storage array.

10. The apparatus of claim 3 wherein the second storage array receives a write command from a host computer to a locally invalid track on the second replica and, in response, writes corresponding data to the second replica, provides the data to the first storage array, where the first storage array writes the data to the first replica, updates the first invalid extent record to indicate that a corresponding extent is valid, and provides an acknowledgement to the host.

11. A method comprising:
   in a network comprising:
      a first storage array comprising a plurality of interconnected computing nodes, each of the computing nodes comprising at least one processor and non-transitory memory, and a plurality of groups of data storage drives, each group of data storage drives connected with one of the computing nodes, wherein the first storage array maintains a first replica of a production volume comprising contiguous logical block addresses that map to non-contiguous addresses of the data storage drives; and
      a second storage array comprising a plurality of interconnected computing nodes, each of the computing nodes comprising at least one processor and non-transitory memory, and a plurality of groups of data storage drives, each group of data storage drives connected with one of the computing nodes, wherein the second storage array maintains a second replica of the production volume comprising contiguous logical block addresses that map to non-contiguous addresses of the data storage drives:
   converging differing characteristics of the first replica and the second replica;
   causing the first replica and the second replica to be discoverable and accessible to hosts while the first replica is inconsistent with the second replica; and
   resolving accesses to extents of data that are inconsistent between the first replica and the second replica based at least in-part on access bias, where the first storage array has preferential bias over the second storage array.

12. The method of claim 11 comprising the first storage array maintaining a first invalid extent record that indicates which extents of the first replica have not been synchronized with the second replica, and the second storage array maintaining a second invalid extent record that indicates which extents of the second replica are considered invalid as inconsistent and which are locally invalid.

13. The method of claim 12 comprising marking all extents in the first invalid extent record and the second invalid extent record as invalid before causing the first replica and the second replica become discoverable and accessible.

14. The method of claim 13 comprising the first storage array receiving a read command from a host computer to a remotely invalid track of the first replica and, in response, providing a corresponding extent from the first replica to the host computer based on access bias and data validity.

15. The method of claim 13 comprising the first storage array receiving a write command from a host computer to a remotely invalid track on the first replica and, in response, writing associated data to the first replica and providing the data to the second storage array where the track is locally invalid.

16. The method of claim 15 comprising the second storage array writing the data to the second replica, updating the second invalid extent record to indicate that a corresponding extent is valid, and providing an acknowledgement to the first storage array.

17. The method of claim 16 comprising the first storage array updating the second invalid extent record to indicate that a corresponding extent is valid and providing an acknowledgement to the host.

18. The method of claim 13 comprising the second storage array receiving a read command from a host computer to a locally invalid track of the second replica and, in response, providing a corresponding extent from the second replica to the host computer based on the extent being present in the non-transitory memory of the second storage array.

19. The method of claim 13 comprising the second storage array receiving a read command from a host computer to a locally invalid track of the second replica and, in response, reading a corresponding extent from the first replica and provides the extent to the host computer based on the extent being absent from the non-transitory memory of the second storage array.

20. The method of claim 13 comprising the second storage array receiving a write command from a host computer to a locally invalid track on the second replica and, in response, writing corresponding data to the second replica, and providing the data to the first storage array, and the first storage array writing the data to the first replica, updating the first invalid extent record to indicate that a corresponding extent is valid, and providing an acknowledgement to the host.

* * * * *